United States Patent [19]

Caraballo

[11] 4,335,173

[45] Jun. 15, 1982

[54] METHOD AND MEANS FOR REDUCING UNDESIRABLE EFFECTS OF DIRT PARTICLES ON A FLEXIBLE RECORD DEVICE

[75] Inventor: Angel Caraballo, Rochester, N.Y.

[73] Assignee: Eastman Kodak Company, Rochester, N.Y.

[21] Appl. No.: 189,503

[22] Filed: Sep. 22, 1980

[51] Int. Cl.³ .................. B32B 3/02; B32B 27/30; H04N 5/76

[52] U.S. Cl. .................. 428/65; 358/128.5; 369/286; 369/287; 369/288; 346/76 L; 346/135.1; 346/137; 428/64; 428/411; 428/480; 428/483; 428/518; 428/520; 428/521; 428/522

[58] Field of Search ............ 428/64, 65, 480, 521, 428/411, 518, 520, 522, 483; 358/128.5; 369/286, 287, 288; 346/76 L, 135.1, 137

[56] References Cited

U.S. PATENT DOCUMENTS

| | | | |
|---|---|---|---|
| 3,250,537 | 5/1966 | Henry | 428/64 |
| 4,006,294 | 2/1977 | Canino | 358/127 |
| 4,060,248 | 11/1977 | Lakervold | 358/127 |
| 4,071,854 | 1/1978 | Bijon | 369/287 |

FOREIGN PATENT DOCUMENTS

698162  11/1964  Canada .

*Primary Examiner*—Ellis P. Robinson
*Attorney, Agent, or Firm*—Arthur H. Rosenstein

[57] ABSTRACT

Methods and means for reducing undesirable effects of dirt particles on a flexible record device are disclosed. These undesirable effects are alleviated in accordance with the present invention by using a multilayer cushioning device to absorb the effect of dirt particles. The multilayer cushioning device comprises an amorphous cushioning layer, a flexible encompassing layer and, optionally, a flexible protective layer. The cushioning device can be superposed on the backside of the flexible record device itself, on a rigid platen of a recording or reading apparatus, or on a separate insert to be placed between the record device and the platen.

9 Claims, 9 Drawing Figures

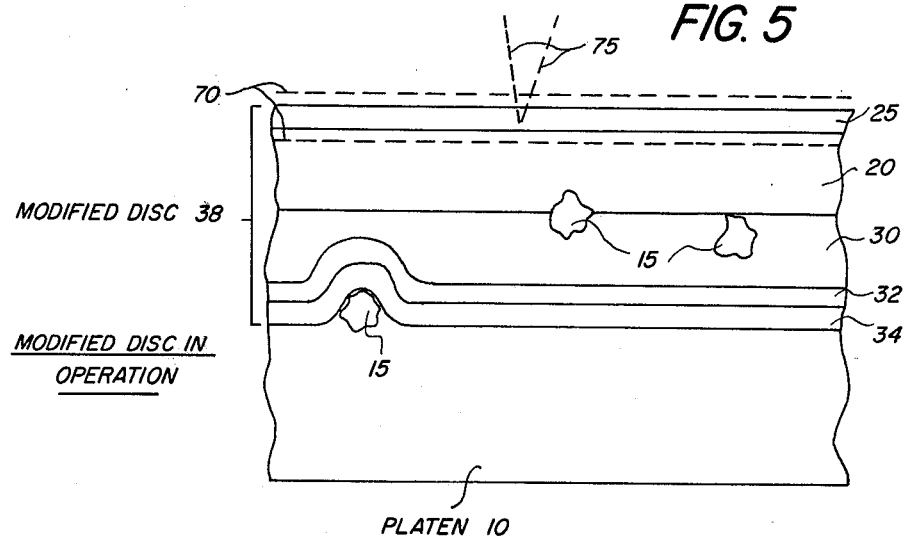
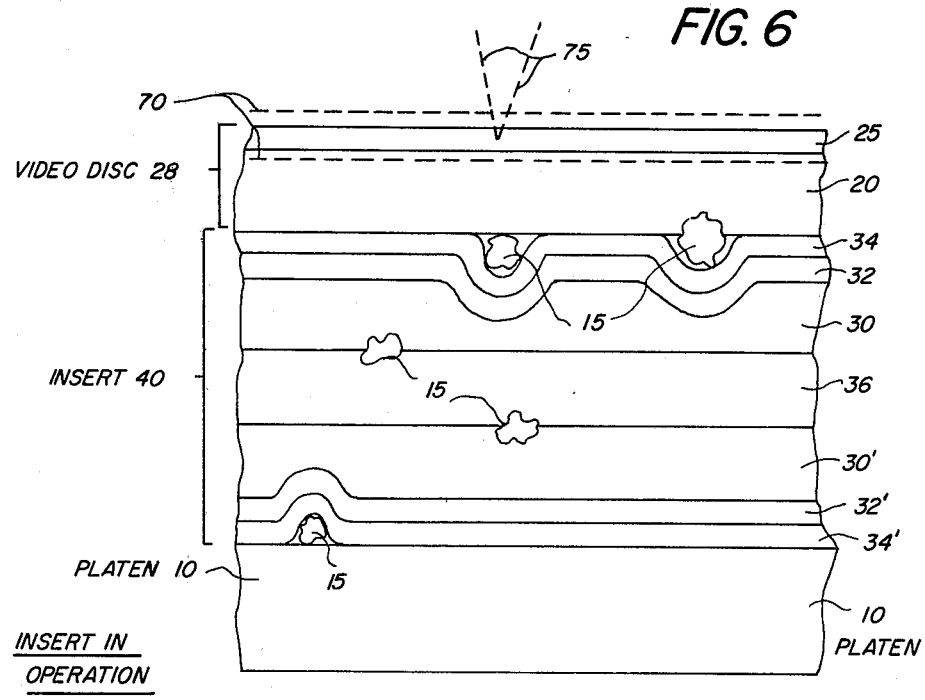

MODIFIED PLATEN IN OPERATION

METHOD AND MEANS FOR REDUCING UNDESIRABLE EFFECTS OF DIRT PARTICLES ON A FLEXIBLE RECORD DEVICE

BACKGROUND OF THE INVENTION

1. Field of the Invention

The present invention relates to recording and reading information on a flexible record device such as a flexible video disc and, more particularly, to methods and means for reducing undesirable effects of dirt particles on such recording and reading.

2. Description Relative to the Prior Art

In order to record video information at a relatively high packing density on a flexible video disc, the video information is commonly recorded in the form of micron and sub-micron sized data bits such as pits, bumps, apertures, etc. Focusing a recording beam to such small dimensions calls for the use of a high numerical aperture optical system. Attendant with the use of a high numerical aperture optical system is an extremely small depth of focus. As used herein, the phrase "depth of focus" is intended to mean the range of distances along the optical axis of the recording beam optical system within which the recording beam is in acceptable focus, i.e., is capable of producing acceptable quality recording on the flexible record device. As an example, if the recorded video information is in the form of data bits as small as half a micron in size, the maximum allowable depth of focus can be as small as one-fourth of a micron, depending upon the wavelength of the recording beam. Keeping the record surface within this depth of focus is difficult even in a static system, i.e., one in which the optical system and flexible record device are not moving. The difficulty, as might be expected, is multiplied in a dynamic recording system wherein the record device and/or the optical system are in motion.

In a conventional video disc recording system, a 12-inch disc spins at a high rate of speed, commonly 1800 rpm. During recording, a modulated recording beam scans the disc so that many video data bits are recorded along a spiral track. All during this recording process the recording beam must be kept in proper focus, which means that the spinning disc surface must be kept within the depth of focus of the recording beam. As stated, the depth of focus for such a system is extremely small and it is very difficult to maintain proper focus.

Disc recording systems which include means for adjusting or maintaining proper focus have been disclosed in the prior art. See, for example, U.S. Pat. Nos. 3,825,323 of Landwer issued July 23, 1974, 4,033,059 of Sugiura et al issued Jan. 11, 1977, and 4,006,294 of Canino issued Feb. 1, 1977. Such systems produce and sense a degree of capacitance or air pressure which is proportional to the distance between a recording beam lens system and a video disc resting on a rigid platen. When a change in capacitance or air pressure is sensed, a servomechanism responds by attempting to reposition the lens system to keep the recording beam in focus on the disc. When a small, localized disc surface irregularity is encountered by the system, even if it is detected as a change in capacitance or air pressure, the lens positioning adjustment may have to take place so fast that the required compensation is beyond the response time of the servomechanism, especially if the lens system is relatively heavy. Therefore, such prior-art recording systems mainly depend upon the video disc to provide a flat surface, preferably an optically flat surface, against which to float or locate in order to define a focal plane. While the air pressure-sensitive recording system of U.S. Pat. No. 4,006,294 is disclosed for use with a flexible video disc lying on top of a rigid turntable, it is doubtful that such an arrangement would perform satisfactorily in those applications wherein it is required to record submicron-sized data bits, where the depth of focus can be as small as a quarter micron.

In particular, if dirt particles have become imbedded in the surface of the flexible disc which contacts the rigid platen or turntable, or if dirt particles have been trapped between the disc and the platen, or if the platen itself has bumps on it, the disc will not lie flat on the platen. Rather, the dirt particles or bumps will cause a "tent-pole" effect; i.e., in the area of each dirt particle the recording surface (i.e., the surface of the disc facing away from the platen) will be pushed up, possibly out of the depth of focus of the recording beam, thus necessitating impossibly rapid focus adjustments of the lens system. The lens system may even literally vibrate in an effort to maintain proper focus. Accurate recording cannot take place under such conditions.

A number of patents discuss the use of a dynamic air cushion between the flexible disc and the rigid platen to avoid such problems with bumps or particles of dirt and dust. See, for example, U.S. Pat. Nos. 4,060,248 of Lakerveld et al issued Nov. 29, 1977, and 3,947,888 of Jarsen issued Mar. 30, 1976. While such dynamic air cushion systems may reduce the effect of dirt particles, they add significant expense and complexity to an apparatus for recording or reading a flexible video disc, since air direction, pressure and consistency must be very precisely designed and maintained.

In another context, Canadian Pat. No. 698,162 of Damerau et al issued Nov. 17, 1964, suggests using a static air cushion trapped between a resilient layer and a flexible magnetic recording disc to compensate for irregularities in a rigid platen. However, in such a system the disc can sag into the air cushion, creating hills and valleys. In fact, in the magnetic recording system addressed by Canadian Pat. No. 698,162, it is desired that the disc not remain flat because the recording method for such a disc consists of a magnetic recording head resting physically upon the disc and creating a valley at the point of contact. At any rate, such a system would not be able to achieve the high packing densities of information necessary for practical recording of video information, and it is nowhere suggested that such a system could be used for practical video recording or that the disc described in this Canadian patent could be adapted to be recorded upon by a focused energy recording beam.

It is, therefore, apparent that a need exists for methods and means for reducing the effect of dirt particles sandwiched between a flexible record device and a rigid platen and, preferably, a means which does not entail the expense and complexity associated with the dynamic air cushion systems discussed above. The present invention provides such methods and means.

It should also be noted that different problems can arise when dirt particles are imbedded in or rest upon the recording surface of a video disc (that is, the surface of the disc facing away from the rigid platen). However, it is not the purpose of the present invention to address or provide a solution for such problems.

SUMMARY OF THE INVENTION

The present invention provides methods and means for reducing the undesirable effects of bumps, dust or dirt particles between a rigid platen of an apparatus for recording or reading and a flexible record device. The method and means are embodied in three basic alternatives: a modified flexible record device; a modified platen; and a cushioning device (also referred to as an insert) to be situated between a flexible record device and a rigid platen.

In the first alternative, a flexible record device having two sides, with at least one side thereof being capable of having information recorded thereon by a focused energy recording beam, further comprises, superposed on the opposite side, a cushioning layer. The cushioning layer comprises an amorphous film-forming material and is completely enveloped either by a flexible encompassing layer or by a flexible encompassing layer and the flexible record device. The flexible encompassing layer is immiscible with and inhibits diffusion therethrough of the amorphous film-forming material. The cushioning layer absorbs the "tent-pole" effect of dirt particles or platen bumps without passing the effect on ultimately to the recording layer. It therefore keeps the outer surface of the recording layer flat enough to remain continuously within the small depth of focus of a recording or reading beam during recording or reading. During recording or reading the flexible record device rests on a rigid platen and is read or recorded upon by a focused energy beam.

In the second alternative, the same cushioning layer and flexible encompassing layer defined above are superposed on the rigid platen instead of being superposed on the flexible record device itself. The cushioning layer in this case is completely enveloped, either by the flexible encompassing layer or by the flexible encompassing layer and the rigid platen, to form a modified platen that will absorb the tent-pole effect of dust and dirt particles rather than allow this effect to be passed on to the flexible record device, which rests on the modified platen during recording or reading.

In the third alternative, the same cushioning layer and flexible encompassing layer defined above are superposed on one or both sides of a flexible support layer to form a separate cushioning device (also referred to as an insert), instead of being superposed directly on the flexible record device or the rigid platen. The cushioning layer in this case is completely enveloped, either by the flexible encompassing layer or by the flexible encompassing layer and the flexible support layer. When it is placed between the flexible record device and the rigid platen, the insert's cushioning layer(s) will absorb the tent-pole effect of dust and dirt particles or platen bumps without passing this effect on to the flexible record device.

In all three alternative embodiments described above, the flexible encompassing layer optionally has a flexible protective layer superposed on it. This is most useful when the encompassing layer comprises a water-soluble material which would otherwise be subject to the degrading effects of contact with moisture in the surrounding atmosphere. The flexible protective layer is water-insoluble and inhibits diffusion of water therethrough.

The invention further provides methods for making the alternative embodiments described above by successively coating the layers of the cushioning system on the flexible record device, rigid platen or separate flexible support layer.

BRIEF DESCRIPTION OF THE DRAWINGS

In the detailed description of the preferred embodiments of the invention presented below, reference is made to the accompanying drawings, in which:

FIG. 2-A represents a cross-sectional view of the entire flexible record device of FIG. 2;

FIG. 2-B represents a cross-sectional view of an alternative embodiment of a flexible record device modified in accordance with the present invention;

FIG. 5 illustrates the effect of the modified flexible record device of FIG. 2 during a recording operation;

FIG. 6 illustrates the effect of the insert of FIG. 3 during a recording operation when used in accordance with the present invention.

None of these drawings has been rendered in relation to any scale, nor do the dimensions of any portions thereof necessarily illustrate a correct proportional relationship to the dimensions of any other portions of the drawings.

DETAILED DESCRIPTION OF THE PREFERRED EMBODIMENTS

Figure 1:
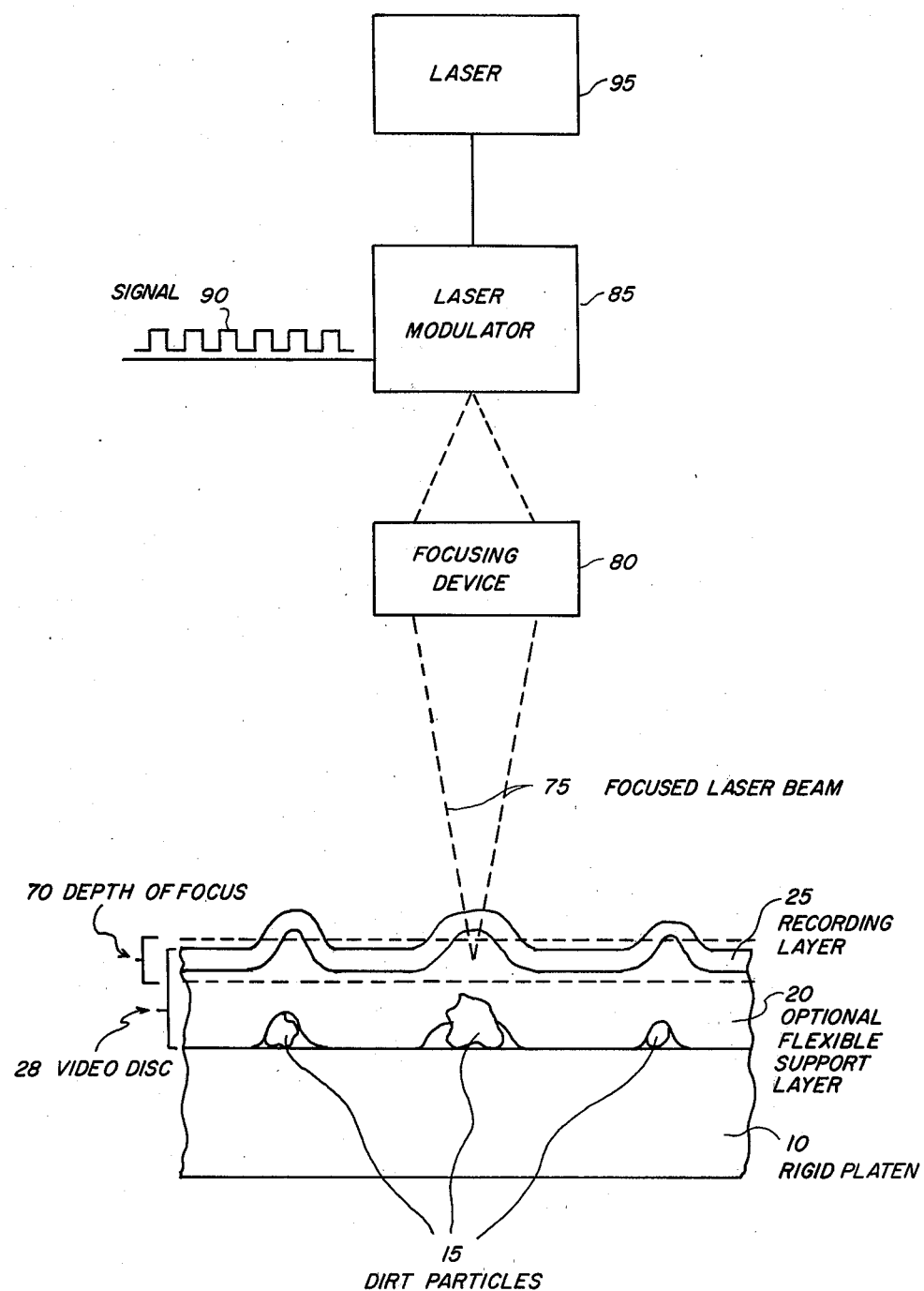
FIG. 1 illustrates a prior art record device and recording apparatus and the attendant problems with dust and dirt particles during a recording operation.

The use of a prior-art flexible video disc and recording apparatus during a recording operation are illustrated in FIG. 1. A signal 90, which contains information in the form of FM encoded or pulse width modulated video, etc., is applied to a laser modulator 85 which modulates a high-intensity energy recording beam from a laser 95 with the encoded video information. A focusing device 80 produces a focused laser recording beam (dotted lines 75), the depth of focus of which is illustrated by dotted lines 70. The focusing device 80 takes various forms known in the art, such as a capacitance-sensitive focusing device (e.g., as disclosed in U.S. Pat. No. 3,825,323) or a type of "airflow" device (e.g., as disclosed in U.S. Pat. Nos. 4,003,059 and 4,006,294). The recording apparatus also has a rigid platen 10 which may be a glass platen or other rigid material.

During the recording operation a flexible record device, in this case flexible video disc 28, rests on rigid platen 10. Flexible video disc 28 comprises a flexible support layer 20 having a flexible recording layer 25 superposed thereon. (The term "flexible" as used throughout this disclosure is intended to mean susceptibility to bending without breaking under the influence of any of a wide range of pressures and is not intended to be limited to any narrow degree of such susceptibility.)

Flexible support layer 20 is optionally omitted, depending upon the type of recording and reading methods intended to be used and the type of recording layer used. For example, when recording layer 25 comprises a material which forms a self-supporting flexible layer or film, an additional support layer is unnecessary, but this further depends upon the methods of recording and reading intended to be used. For example, in U.S. Pat. No. 4,023,185 of Bloom et al issued May 10, 1977, hereby incorporated herein by reference, the recording method chosen is one of vaporization or ablation to form holes in the recording layer, and it is intended that the recorded information be read by detecting these holes by measuring the intensity of a reflected reading beam. In order to use such a method, it is necessary that the recording layer be superposed on a support layer which will reflect the reading beam, even if the recording layer could otherwise be self-supporting. In contrast to this, if, for example, the recording layer is a self-supporting material, and the recording material is again ablation, but the reading method is one of measuring the intensity of a reading beam passing through the recording layer (i.e., measuring the transmission density of the recording layer), then it would be desirable to have no support layer beneath the recording layer (or, at least, to have a support layer which is transparent rather than reflective).

When it is present, flexible support layer 20 comprises any flexible material [e.g., poly(ethylene terephthalate) or cellulose acetate] which has a relatively high melting point (to avoid heat deformation during recording), has a smooth surface (to minimize noise) and is capable of being coated with recording layer 25 with good adhesion and no significant adverse chemical reactivity between recording layer 25 and support layer 20. Also, if it is desirable for flexible support layer 20 to be reflective, then it must either comprise a material which is itself reflective to the reading beam of choice, or it must have superposed thereon a thin flexible layer of reflective material (e.g., a 500-Å thick reflective layer of aluminum, bismuth, rhodium or the like), before recording layer 25 is superposed thereon.

Recording layer 25 comprises a flexible recording-sensitive material (many of which are well-known in the video disc art), such as a thin metal film (e.g., tin or tantalum as disclosed in U.S. Pat. No. 3,465,352 of Carlson et al issued Sept. 2, 1969, hereby incorporated herein by reference), a photoresist material, certain organic materials (e.g., 4-phenyl-azo-1-naphthylamine as disclosed in U.S. Pat. No. 4,023,185), a deformable organic material (e.g., the dye Iosol Red), a dye and a binder (e.g., the dye Sudan IV in cellulose nitrate), or the like. The thickness of recording layer 25 varies depending on the material and the recording method chosen.

Ideally, during recording, the outer surface of recording layer 25 is sufficiently flat to remain continuously within the depth of focus 70 of focused laser beam 75, while there is relative motion between laser 95 and recording layer 25 (usually, rigid platen 10 will be spinning at approximately 1800 rpm during recording or reading). However, as FIG. 1 illustrates, if dirt particles 15 have become imbedded in flexible support layer 20 or have been trapped between support layer 20 and rigid platen 10 when the disc is placed on the platen, then the outermost surface of the recording layer 25 or even the entire thickness of the recording layer in the area of a dirt particle can be forced out of depth of focus 70. When this occurs, accurate laser recording or reading cannot be achieved in this area, because it will be out of focus.

Figure 2:
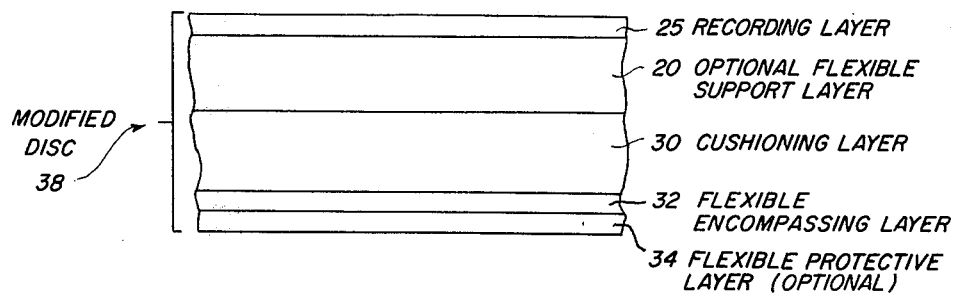
FIG. 2 represents a cross-sectional view of a portion of a flexible record device modified in accordance with the present invention.
Figure 2A:
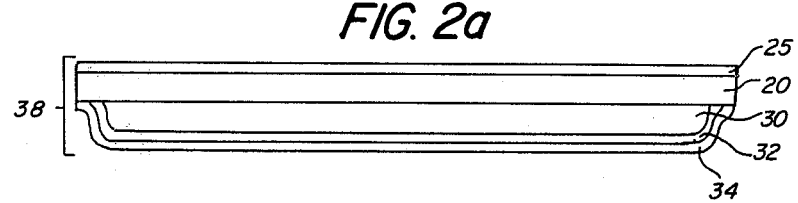
Figure 2B:
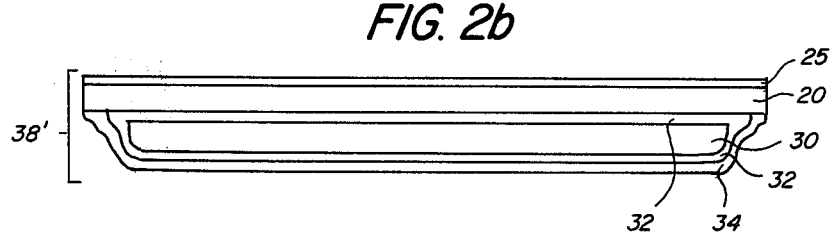

Each of the embodiments of the present invention represented by FIGS. 2, 2-A, 2-B, 3 and 4 alleviates the dirt particle problem described above.

FIG. 2 represents a flexible record device 38, which is a multilayered disc comprising recording layer 25, optional flexible support layer 20, cushioning layer 30, flexible encompassing layer 32 and optional flexible protective layer 34. Recording layer 25 and optional flexible support layer 20 are as previously described in relation to FIG. 1. As described in relation to flexible video disc 28 of FIG. 1, flexible support layer 20 is optionally present and, if present, is optionally reflective, depending upon the type of recording and reading methods intended to be used and the type of recording layer chosen.

Cushioning layer 30 comprises an amorphous film-forming material. "Film-forming material" is intended to mean a material which can be coated onto a flat surface and which is viscous enough to stand by itself on that surface in the form of a film having a uniform, and desired degree of, thickness. A uniform thickness is desirable in order to keep the outer surface of recording layer 25 flat when modified disc 38 is resting on a rigid platen during recording or reading. The term "amorphous", as used herein, is intended to mean that the film-forming material will readily absorb the effect of dirt particles or other surface irregularities (which may become sandwiched between itself and another surface) while remaining essentially flat; i.e., the film-forming material will shift or flow in order to conform to or provide space for such dirt particles or surface irregularities. (FIG. 5 provides an illustration of this property.). Thus, the amorphous film-forming material of cushioning layer 30 is viscous enough to be coated flat at a desired thickness, but amorphous enough to provide a space readily under pressure caused, for example, by a dirt particle. Suitable amorphous film-forming materials in accordance with the present invention include, but are not limited to: a viscous liquid; and a solution of polymer and solvent. Preferred solutions of polymer and solvent comprise from about 5 percent to about 25 percent polymer by weight and from about 95 percent to about 75 percent solvent by weight. If a water-soluble polymer is chosen, the solvent is water. If a water-insoluble polymer is chosen, the solvent is an organic solvent in which the polymer will readily dissolve. Examples of suitable polymers include, but are not limited to, the water-soluble polymers: poly(acrylamide); poly(acrylamide-co-2-acetoacetoxyethyl methacrylate) (weight ratio 90/10); and poly(2-acrylamido-2-methylpropanesulfonic acid), and the water-insoluble polymers: cyclized polyisoprene and poly(methyl methacrylate). Suitable organic solvents include, but are not limited to: alkanols having at least 3 carbon atoms, such as tertiary butanol; aromatic hydrocarbons, such as benzene and xylene; and halogenated aromatic hydrocarbons, such as chlorobenzene. An especially preferred cushioning layer comprises 10 percent by weight of polymer and 90 percent by weight of solvent.

Cushioning layer 30 must be sufficiently thick to keep the outermost surface of recording layer 25 sufficiently flat to remain continuously within the depth of focus of a recording beam during recording and continuously within the depth of focus of a reading beam during reading. The thickness of cushioning layer 30 is chosen to accommodate the largest dirt particles expected to be frequently encountered. The thickness is larger than the largest dimension of such largest dirt particles. In most cases, a thickness of from about 0.17 to about 0.64 millimeter will suffice.

Cushioning layer 30 is preferably prepared by coating the amorphous film-forming material directly on flexible support layer 20 to the desired thickness by any of the known coating methods such as bar-coating, spray-coating and spin-coating. During the coating process, the effect of any dirt particles previously imbedded in or resting upon support layer 20 will be immediately eliminated, because these dirt particles will be enveloped by the amorphous film-forming material during coating. When the coating of cushioning layer 30 is complete, coating of flexible encompassing layer 32 directly upon cushioning layer 30 is begun immediately or at least before any appreciable amount of the liquid or solvent in cushioning layer 30 can evaporate. It is theorized that the viscous liquid or solvent imparts to cushioning layer 30 its amorphous cushioning effect and, therefore, it is desirable that as little as possible of this liquid or solvent be allowed to evaporate from the cushioning layer.

Flexible encompassing layer 32 comprises a flexible film-forming material which is immiscible with and inhibits diffusion therethrough of the amorphous film-forming material of cushioning layer 30. It is thought that this encompassing layer keeps cushioning layer 30 intact and free from degrading atmospheric effects. The statement that the encompassing layer "inhibits diffusion", is intended to mean that the encompassing layer keeps enough solvent in the cushioning layer so that the cushioning layer remains sufficiently amorphous to have the desired cushioning effect in relation to dirt particles (as described previously). The flexible film-forming material of flexible encompassing layer 32 is generally a polymer. When the amorphous film-forming material of cushioning layer 30 contains water, encompassing layer 32 preferably comprises a flexible water-insoluble polymer which inhibits diffusion therethrough of the amorphous film-forming material of the cushioning layer. Examples of such a flexible water-insoluble polymer include, but are not limited to, polymers such as cyclized polyisoprene and poly(methyl methacrylate). When the amorphous film-forming material of cushioning layer 30 contains an organic liquid or solvent, encompassing layer 32 preferably comprises a flexible water-soluble polymer, such as poly(acrylamide); poly(acrylamide-co-2-acetoacetoxyethyl methacrylate) (weight ratio 90/10); or poly(2-acrylamido-2-methylpropanesulfonic acid).

Flexible encompassing layer 32 is prepared by coating a solution of the chosen polymer and appropriate solvent directly on cushioning layer 30 and then driving off the solvent from the encompassing layer or allowing it to evaporate. The drying conditions chosen should be sufficient to remove the solvent from the encompassing layer without adversely affecting the cushioning layer; i.e., all or nearly all of the liquid initially present in the cushioning layer should remain in that layer after the solvent is removed from the encompassing layer. Any of the widely known coating methods such as bar-coating, spray-coating or spin-coating are used to form the encompassing layer. The dried layer of polymer should be thick enough to adequately inhibit diffusion of liquid from cushioning layer 30, but as thin as possible in order to achieve maximum flexibility.

In order for encompassing layer 32 to serve its purpose, it should be coated so that it, together with flexible support layer 20, completely envelops cushioning layer 30. This is illustrated in FIG. 2-A, which represents a smaller scale cross-sectional view of the entire flexible record device of FIG. 2 and which shows how encompassing layer 32 can contact flexible support layer 20 near the edges of modified disc 38 in order to completely envelop cushioning layer 30 and, thus, keep it intact.

An alternative enveloping arrangement is illustrated in FIG. 2-B. Modified disc 38' is the same as modified disc 38, except that in modified disc 38' cushioning layer 30 is completely enveloped solely by encompassing layer 32, rather than by encompassing layer 32 and support layer 20 together. Such an arrangement would be especially useful if the amorphous film-forming material of cushioning layer 30 were of a type that would adversely interact chemically or physically with support layer 20 if those two layers were allowed to come into contact with each other. The preparation of modified disc 38' is similar to the preparation of modified disc 38, except that in the case of modified disc 38' a portion of flexible encompassing layer 32 is coated onto support layer 20 and dried, and then cushioning layer 30 is coated thereon. The remainder of encompassing layer 32 is then coated and dried as previously described, in order to form a continuous encompassing layer 32 which, by itself, completely envelops cushioning layer 30, as illustrated in FIG. 2-B.

Optionally, modified disc 38 or 38' also comprises a flexible protective layer 34 superposed on flexible encompassing layer 32. This is most desirable when flexible encompassing layer 32 comprises a water-soluble material which would otherwise be subject to the degrading effects of contact with moisture in the surrounding atmosphere. In such a case, flexible protective layer 34 comprises a flexible water-insoluble polymer, such as cyclized polyisoprene or poly(methyl methacrylate), and is solvent-coated directly on flexible encompassing layer 32 by one of the previously mentioned coating techniques, followed by drying off the solvent.

Figure 3:
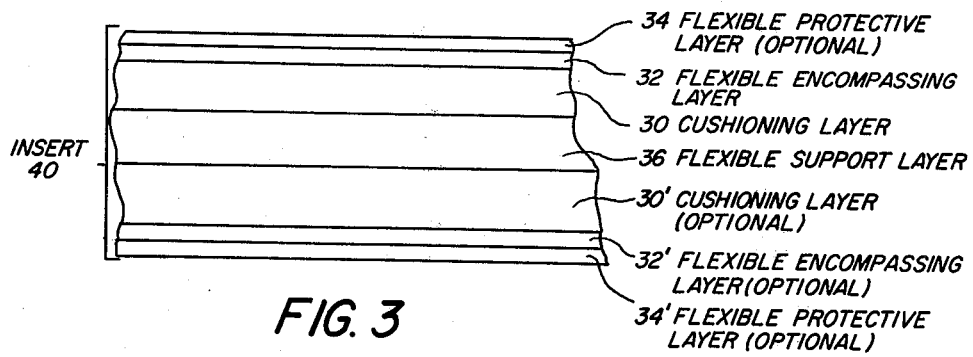
FIG. 3 represents a cross-sectional view of a portion of an insert in accordance with the present invention.

FIG. 3 represents a cushioning device, insert 40, which is a multilayered element comprising flexible support layer 36, cushioning layer 30, flexible encompassing layer 32, optional flexible protective layer 34, optional cushioning layer 30', optional flexible encompassing layer 32' and optional flexible protective layer 34'. This insert is designed to be interposed between a flexible record device and a rigid platen during recording or reading.

The composition and preparation of cushioning layer 30, flexible encompassing layer 32 and optional flexible protective layer 34 are as described previously for modified disc 38 of FIG. 2 except that, in the case of insert 40 of FIG. 3, cushioning layer 30 is coated on flexible support layer 36 rather than on flexible support layer 20. Cushioning layer 30 is completely enveloped by flexible encompassing layer 32 or by flexible encompassing layer 32 and flexible support layer 36 in a fashion similar to the enveloping arrangements illustrated for modified discs 38 and 38' in FIGS. 2-A and 2-B, respectively. Also, the cushioning, encompassing and protective layers are optionally coated on both sides of flexible support layer 36 (as designated by reference numerals 30', 32' and 34', respectively).

Flexible support layer 36 comprises any flexible film-forming material [e.g., poly(ethylene terephthalate) or cellulose acetate].

Figure 4:
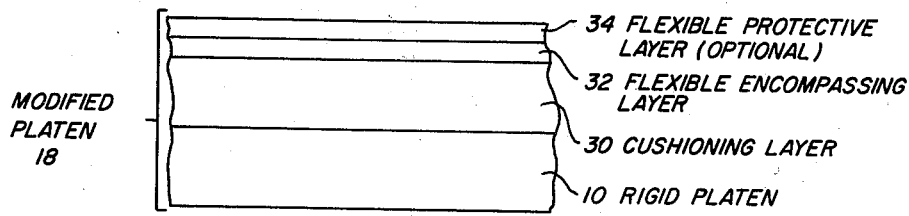
FIG. 4 represents a cross-sectional view of a portion of a platen modified in accordance with the present invention.

FIG. 4 represents a modified platen 18 of a recording or reading apparatus. Modified platen 18 is a multilayered platen comprising rigid platen 10, cushioning layer 30, flexible encompassing layer 32 and optional flexible protective layer 34. Modified platen 18 is designed to support a flexible record device (such as video disc 28 of FIG. 1) during recording or reading.

The composition and preparation of rigid platen 10, cushioning layer 30, flexible encompassing layer 32 and flexible protective layer 34 are as described previously in the descriptions of FIGS. 1 and 2, except that in the case of modified platen 18 of FIG. 4, cushioning layer 30 is coated directly on rigid platen 10 rather than on reflective flexible support layer 20. Cushioning layer 30 is completely enveloped either by flexible encompassing layer 32 or by flexible encompassing layer 32 and rigid platen 10 in a fashion similar to the enveloping arrangements illustrated for modified discs 38 and 38' in FIGS. 2-A and 2-B, respectively.

Figure 7:
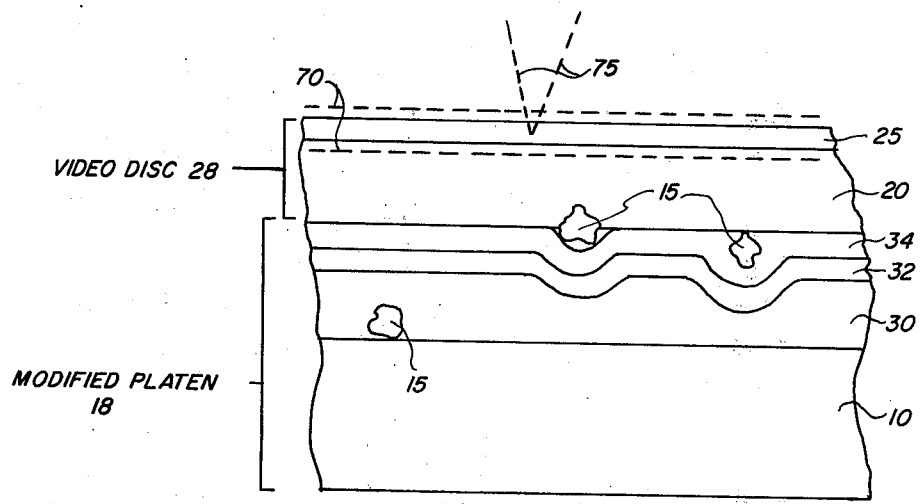
FIG. 7 illustrates the effect of the modified platen of FIG. 4 during a recording operation.

The utility of each of the 3 embodiments of the present invention represented by FIGS. 2, 3 and 4 is illustrated in FIGS. 5, 6 and 7, respectively.

FIG. 5 partially illustrates the recording apparatus of FIG. 1 being used to record on modified disc 38 of FIG. 2 resting on rigid platen 10.

FIG. 6 partially illustrates the recording apparatus of FIG. 1 being used to record video disc 28 of FIG. 1, while it rests on insert 40 of FIG. 3, which in turn rests on rigid platen 10.

FIG. 7 partially illustrates the recording apparatus of FIG. 1 being used to record video disc 28 of FIG. 1, while it rests on modified platen 18 of FIG. 4.

In each recording operation illustrated by FIGS. 5, 6 and 7, the flexible record device is being recorded upon with the apparatus and according to the method described above in relation to FIG. 1. In general, recording and reading are achieved by using any of the methods well-known to those of ordinary skill in the video disc art (for example, as described in U.S. Pat. No. 3,825,323 and the patents referenced therein, and in copending U.S. patent application Ser. No. 885,921 filed Mar. 13, 1978). FIGS. 5, 6 and 7 show that each of the preferred embodiments of the invention (modified disc 38, insert 40 and modified platen 18) achieves the purpose of reducing or eliminating the undesirable effects of dirt particles 15 which were imbedded in or resting upon support layer 20 or were resting upon rigid platen 10. In each case the amorphous film-forming material of cushioning layer 30 has shifted in the area of dirt particles 15, thus absorbing the "tent-pole" effects of these dirt particles while keeping recording layer 25 flat enough to remain continuously within the depth of focus 70 of focused laser recording beam 75 during recording. Recording and reading can now be accurately achieved on all areas of recording layer 25, because all areas are now in focus.

The following example is presented to further illustrate a preferred embodiment of the invention.

EXAMPLE

A flexible video disc comprising a flexible support layer of poly(ethylene terephthalate) having superposed on one side thereof a 500-Å thick reflective layer of aluminum overcoated with a recording layer having a thickness of 1200 Å and comprising 50 percent by weight of the dye {2,5-bis(4-diethylaminobenzylidene)-cyclopentanone} and 50 percent by weight of the binder nitrocellulose was prepared. A 10 percent aqueous solution of poly(2-acrylamido-2-methylpropanesulfonic acid) was spin-coated onto the other side of the flexible support layer to form a cushioning layer having a uniform thickness of 0.2 mm. Before any significant evaporation of water from the cushioning layer could occur, the layer was overcoated with a flexible encompassing layer by spin-coating a 10 percent solution of cyclized polyisoprene in xylene. The xylene was dried off to form a flexible encompassing layer of polyisoprene, which had a uniform thickness of 4μ and, together with the flexible support layer, completely enveloped the cushioning layer to keep it intact.

It was found that when the resultant modified video disc was recorded upon by a modulated laser recording beam while the disc rested upon a rigid platen spinning at 1800 rpm (with the flexible encompassing layer contacting the platen), accurate recording was achieved because the cushioning layer absorbed the effect of any dirt particles sandwiched between the disc and the platen, thereby keeping the outer surface of the recording layer flat enough to remain continuously within the depth of focus of the laser beam during recording.

The invention has been described in detail with particular reference to preferred embodiments thereof, but it will be understood that variations and modifications can be effected within the spirit and scope of the invention.

What is claimed is:

1. In a flexible record device comprising a flexible support layer having a recording layer on one side thereof,
the improvement wherein said flexible record device has superposed on the opposite side of said recording layer a cushioning layer having an average thickness of from about 0.17 millimeter to about 0.64 millimeter completely enveloped either by a flexible encompassing layer or by a flexible encompassing layer and said flexible support layer; said cushioning layer comprising an amorphous film-forming material and said flexible encompassing layer being immiscible with and inhibiting diffusion therethrough of said amorphous film-forming material.

2. The flexible record device of claim 1 wherein said amorphous film-forming material comprises a solution of from 5 percent to 25 percent by weight of a first polymer and from 95 percent to 75 percent by weight of a solvent for said first polymer, and said flexible encompassing layer comprises a second polymer which is insoluble in said solvent for said first polymer.

3. The flexible record device of claim 2 wherein said first polymer is a water-soluble polymer, said solvent is water and said second polymer is a water-insoluble polymer.

4. The flexible record device of claim 3 wherein said water-soluble first polymer is selected from:
   (a) poly(acrylamide);
   (b) poly(acrylamide-co-2-acetoacetoxyethyl methacrylate) (weight ratio 90/10); and
   (c) poly(2-acrylamido-2-methylpropanesulfonic acid); and said water-insoluble second polymer is selected from:
   (d) cyclized polyisoprene; and
   (e) poly(methyl methacrylate).

5. The flexible record device of claim 1 wherein said amorphous film-forming material comprises a solution of 10 percent by weight of poly(2-acrylamido-2-methylpropanesulfonic acid) and 90 percent by weight of water, and said flexible encompassing layer comprises cyclized polyisoprene.

6. The flexible record device of claim 2 wherein said first polymer is a water-insoluble polymer, said solvent is an organic solvent, said second polymer is a water-soluble polymer and said flexible record device comprises, superposed on said flexible encompassing layer, a flexible protective layer which is water-insoluble and inhibits diffusion of water therethrough.

7. The flexible record device of claim 1 wherein said flexible support layer is a reflective flexible support layer.

8. The flexible record device of claim 7 wherein said reflective support layer comprises a layer of poly(ethylene terephthalate) having aluminum superposed thereon.

9. The flexible record device of claim 1 wherein said recording layer comprises a dye and a binder.

* * * * *